United States Patent
Sakano et al.

(10) Patent No.: US 12,152,636 B2
(45) Date of Patent: Nov. 26, 2024

(54) SEALING DEVICE

(71) Applicant: NOK CORPORATION, Tokyo (JP)

(72) Inventors: Yuya Sakano, Fukushima (JP); Yuichi Tarukawa, Fukushima (JP)

(73) Assignee: NOK CORPORATION (JP)

( * ) Notice: Subject to any disclaimer, the term of this patent is extended or adjusted under 35 U.S.C. 154(b) by 64 days.

(21) Appl. No.: 17/922,048

(22) PCT Filed: May 17, 2021

(86) PCT No.: PCT/JP2021/018647
§ 371 (c)(1),
(2) Date: Oct. 28, 2022

(87) PCT Pub. No.: WO2021/235397
PCT Pub. Date: Nov. 25, 2021

(65) Prior Publication Data
US 2023/0265886 A1    Aug. 24, 2023

(30) Foreign Application Priority Data

May 22, 2020 (JP) .................................. 2020-089484

(51) Int. Cl.
*F16C 33/78* (2006.01)
*F16C 19/18* (2006.01)

(52) U.S. Cl.
CPC .......... *F16C 33/7823* (2013.01); *F16C 19/18* (2013.01); *F16C 33/7883* (2013.01); *F16C 2326/02* (2013.01)

(58) Field of Classification Search
CPC .............. F16C 33/7823; F16C 33/7876; F16C 33/7879; F16C 33/7883; F16C 33/805
See application file for complete search history.

(56) References Cited

U.S. PATENT DOCUMENTS

| 7,731,200 B2 | 6/2010 | Matsui et al. |
| 2005/0104302 A1 | 5/2005 | Matsui et al. |

(Continued)

FOREIGN PATENT DOCUMENTS

| JP | 2004132519 A | * | 4/2004 | .......... F16C 33/7873 |
| JP | 2005264999 A | * | 9/2005 | |

(Continued)

OTHER PUBLICATIONS

International Search Report (English and Japanese) issued in PCT/JP2021/018647, mailed Jul. 13, 2021; ISA/JP (5 pages).

(Continued)

*Primary Examiner* — James Pilkington
*Assistant Examiner* — Aimee Tran Nguyen
(74) *Attorney, Agent, or Firm* — Harness, Dickey & Pierce, P.L.C.

(57) ABSTRACT

A sealing device includes a first sealing member and a second sealing member. The first sealing member has a sleeve mounted on an inner member, and a flange. The second sealing member has a tubular portion mounted on the outer member, a disk portion that faces the flange, a radial lip in slidable contact with the sleeve, and a side lip extending from the disk portion and being in slidable contact with the flange. The first sealing member has an annular first protrusion protruding from the flange toward the disk portion. The first protrusion is disposed radially outside the side lip and overlaps the side lip in radial directions. The second sealing member has an annular second protrusion protruding from the disk portion toward the flange. The second protrusion is disposed radially outside the first protrusion and overlaps the first protrusion in radial directions.

8 Claims, 5 Drawing Sheets

(56) References Cited

U.S. PATENT DOCUMENTS

| | | | |
|---|---|---|---|
| 2015/0098670 A1 | 4/2015 | Gulli | |
| 2017/0097045 A1 | 4/2017 | Umekida et al. | |
| 2017/0284471 A1* | 10/2017 | Shibayama | F16C 33/7883 |
| 2020/0141448 A1* | 5/2020 | Kim | F16J 15/3264 |

FOREIGN PATENT DOCUMENTS

| | | | | |
|---|---|---|---|---|
| JP | 2010281386 A | * | 12/2010 | F16C 33/7823 |
| JP | 2013-006488 A | | 1/2013 | |
| JP | 2013-050132 A | | 3/2013 | |
| JP | 2013-242036 A | | 12/2013 | |
| JP | 2018-053991 A | | 4/2018 | |
| KR | 20130053640 A | * | 5/2013 | |
| WO | 2003-069177 A1 | | 8/2003 | |
| WO | 2015-182357 A1 | | 12/2015 | |

OTHER PUBLICATIONS

Extended European Search Report for corresponding Application No. 21809178.3 dated Sep. 26, 2023 (7 Pages).
Decision of Refusal issued in corresponding Japanese Patent Application No. 2022-524465 dated Apr. 16, 2024, with English translation (6 Pages).

* cited by examiner

SEALING DEVICE

CROSS REFERENCE TO RELATED APPLICATIONS

This application is a U.S. National Phase Application under 35 U.S.C. 371 of International Application No. PCT/JP2021/018647, filed on May 17, 2021, which claims priority to Japanese Patent Application No. 2020-089484, filed on May 22, 2020. The entire disclosures of the above applications are expressly incorporated by reference herein.

BACKGROUND

Technical Field

The present invention relates to sealing devices.

Related Art

A hub of an automotive vehicle is provided with a rolling bearing that supports an axle. The rolling bearing is called a hub bearing. A sealing device is provided between the inner race and the outer race of a hub bearing. The sealing device acts to seal lubricant (grease) inside the bearing and prevents foreign matter, such as water and dust from ingress into the inside of the bearing.

There are two types of hub bearings: an inner-race rotating type and an outer-race rotating type (WO 2015/182357). In the inner-race rotating type, the outer race is fixed to the vehicle body, whereas the inner race and the hub are fixed to the axle and rotate with the axle. This type is used for both driving wheels and driven wheels since this type allows wheels to rotate with the axle. The outer-race rotating type is a type in which the inner race is fixed to a stationary axle and in which the outer race is fixed to the wheel and rotates with the wheel. This type is used for driven wheels since the axle is limited to be stationary.

A sealing device installed in a hub bearing has a sealing member fixed to the outer race, which is the outer member, and another sealing member fixed to the inner race, which is the inner member. The sealing members are brought into slidable contact with each other.

In a sealing device used in a hub bearing of the outer-race rotating type, a centrifugal force is applied to the sealing member fixed to the outer race. In order to maintain contact between the sealing members even when a centrifugal force is applied, the contact pressure between them should be increased. It is desirable that the sealing device have a long life span even in such an environment.

In addition, it is desirable that water do not enter the sealed object (e.g., bearing) if the sealing device is used in an environment with a lot of water.

SUMMARY

Accordingly, the present invention provides a sealing device with a long life span and superior ability to protect the sealed object from foreign matter.

In accordance with an aspect of the present invention, there is provided a sealing device adapted to be disposed between a stationary inner member and a rotating outer member for sealing a gap between the inner member and the outer member. The sealing device includes a first sealing member having a sleeve adapted to be mounted on the inner member, and a flange that extends radially outward from the sleeve; and a second sealing member having a tubular portion disposed radially outside the flange and adapted to be mounted on the outer member, a disk portion that extends radially inward from the tubular portion and that faces the flange, a radial lip disposed radially inside the disk portion and adapted to be in slidable contact with the sleeve, and a side lip extending from the disk portion toward the flange and adapted to be in slidable contact with the flange. The first sealing member has an annular first protrusion protruding from the flange toward the disk portion of the second sealing member, and the first protrusion is disposed radially outside the side lip and overlaps the side lip in radial directions. The second sealing member has an annular second protrusion protruding from the disk portion toward the flange of the first sealing member, and the second protrusion is disposed radially outside the first protrusion and overlaps the first protrusion in radial directions.

According to this aspect, the first protrusion formed in the first sealing member reduces discharge of grease from the space between the flange and the disk portion subjected by centrifugal force. Since the grease in this space reduces abrasion of the side lip, keeping the grease in the space increases the life span of the side lip. Since the second protrusion formed in the second sealing member is positioned outside the first protrusion, it is difficult for foreign matter to enter the space between the flange and the disk portion from the outside. Since the second sealing member is mounted on the rotating outer member, the second protrusion of the second sealing member can repel away foreign matter.

DETAILED DESCRIPTION

Hereinafter, with reference to the accompanying drawings, various embodiments according to the present invention will be described. It is of note that the drawings are not necessarily to scale, and certain features may be exaggerated or omitted.

Figure 1:
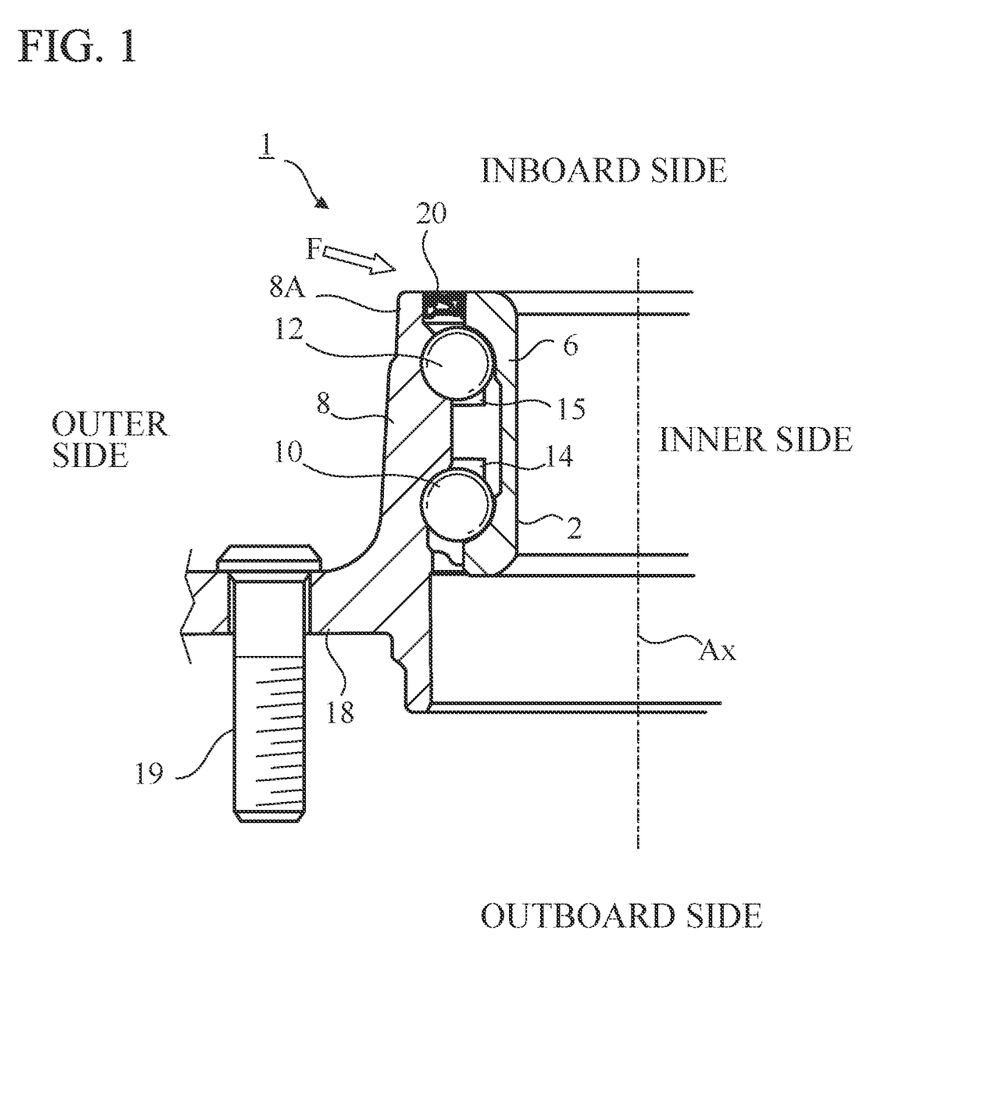
FIG. 1 is a partial cross-sectional view of an example of a rolling bearing in which a sealing device according to an embodiment of the present invention is used.

FIG. 1 shows a hub bearing for an automotive vehicle, which is an example of a rolling bearing in which a sealing device according to each embodiment of the present invention is used. However, the application of the present invention is not limited to hub bearings, and the present invention is applicable to other types of rolling bearings. In the following description, the hub bearing is a ball bearing. Again, the present invention is not limited to ball bearings, and is applicable to other types of rolling bearings, such as roller bearings and needle bearings, and other types of rolling elements. The invention is also applicable to rolling bearings used in machines other than automotive vehicles.

The hub bearing 1 is of the outer-race rotating type, in which the inner race is fixed to a stationary axle and the outer race is fixed to a wheel and rotates with the wheel. The hub bearing 1 has an inner race (inner member) 6 having a hole 2 into which the axle is inserted, an outer race (outer member) 8 located outside the inner race 6, multiple balls 10 arranged in a row between the inner race 6 and the outer race 8, multiple balls 12 arranged in a row between the inner race 6 and the outer race 8, and retainers 14 and 15 that retain the balls in place.

The inner race 6 is fixed to a stationary axle. The outer race 8 has the role of a hub fixed to the wheel. Accordingly, the outer race 8 has a hub flange 18, to which a wheel can be attached by means of hub bolts 19. Thus, the outer race 8 is fixed to the wheel and rotates with the wheel. However, the outer race 8 and hub flange 18 may be formed as separate components and may be fixed together.

In FIG. 1, the central axis Ax common to the axle and the hub bearing 1 extends in a vertical direction. In FIG. 1, relative to the central axis Ax only the left part is shown; and although not shown in detail, in FIG. 1 the lower side corresponds to the outer side (outboard side) of the automotive vehicle on which wheels are arranged, while the upper side corresponds to the inner side (inboard side) on which differential gears are arranged. In FIG. 1, the "outer side" and the "inner side" mean the radial outer side and the radial inner side, respectively.

A sealing device 20 that seals a gap between the outer race 8 and the inner race 6 is located close to the end portion 8A of the outer race 8 on the inboard side. The sealing device 20 prevents outflow of grease, i.e., a lubricant from the interior of the hub bearing 1, and prevent intrusion of foreign matter (including water, including muddy water and salt water, and dust) into the interior of the hub bearing 1 from the outside. In FIG. 1, an arrow F indicates an example direction of an exterior flow of foreign matter.

First Embodiment

Figure 2:
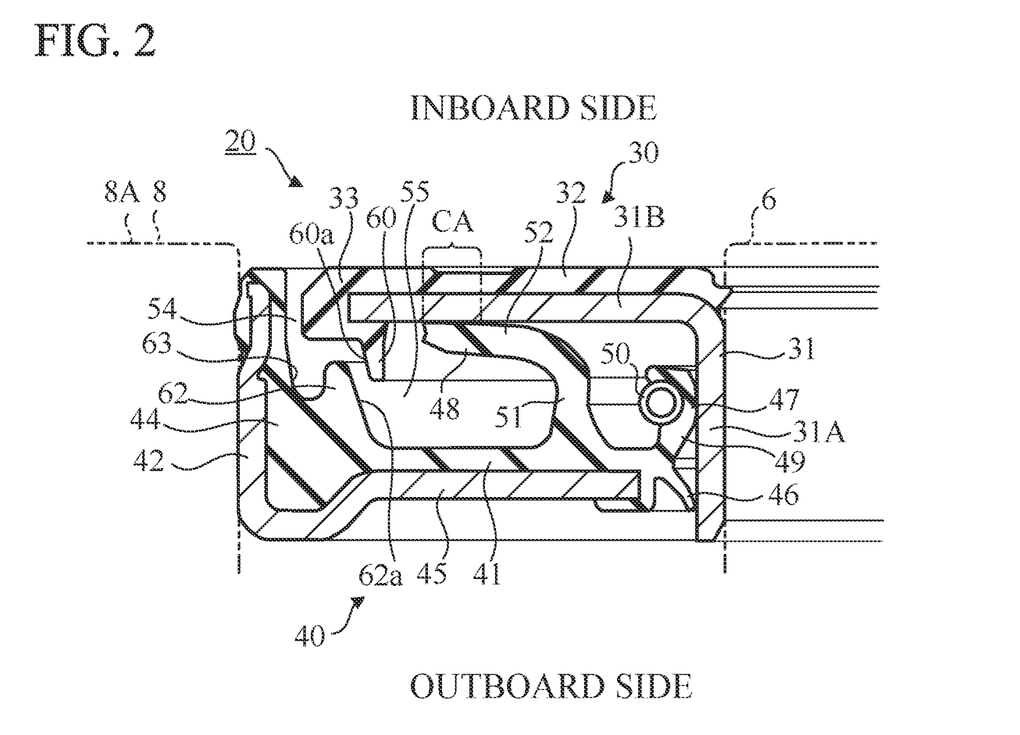
FIG. 2 is a partial cross-sectional view of a sealing device according to a first embodiment of the present invention.

As shown in FIG. 2, the sealing device 20 is disposed in a gap between the end portion 8A on the inboard side of the outer race 8 of the hub bearing 1 and the inner race 6 of the hub bearing 1. The sealing device 20 is annular in shape; although, in FIG. 2 only the left part of the sealing device 21 is shown. As can be seen from FIG. 2, the sealing device 20 has a composite structure that includes a first sealing member 30 and a second sealing member 40.

The first sealing member 30 is a stationary sealing member fixed to the stationary inner race 6 and does not rotate. The first sealing member 30 has a composite structure including a rigid ring 31 and an elastic ring 32. The rigid ring 31 is made of a rigid material such as a metal. The elastic ring 32 is made of an elastic material such as an elastomer.

As viewed in cross section, the rigid ring 31 is substantially L-shaped. Specifically, the ring 31 includes a cylindrical sleeve 31A and a circular annular flange 31B that extends radially outward from the sleeve 31A. The sleeve 31A is attached to the inner race 6. More specifically, an end portion of the inner race 6 is engaged by interference fit, namely, is press-fitted into the sleeve 31A. The flange 31B is a flat plate and lies on a plane perpendicular to the axis of sleeve 31A. The flange 31B is located on the inboard side of the sleeve 31A.

The elastic ring 32 is in close contact with the flange 31B of the rigid ring 31. More specifically, the elastic ring 32 covers the entirety of the surface on the inboard side of the flange 31B and covers the outer edge of the flange 31B, and also covers an outer portion of the surface on the outboard side of the flange 31B. Thus, the elastic ring 32 and flange 31B can be considered to constitute a flange 33.

The second sealing member 40 is a rotational sealing member fixed to the rotating outer race 8 and rotates. The second sealing member 40 also has a composite structure including an elastic ring 41 and a rigid ring 42. The elastic ring 41 is made of an elastic material such as an elastomer. The rigid ring 42 is made of a rigid material such as a metal, and reinforces the elastic ring 41. As viewed in cross section, the rigid ring 42 is substantially L-shaped. A portion of the rigid ring 42 is embedded in the elastic ring 41 and is tightly attached to the elastic ring 41.

The second sealing member 40 has a tubular portion 44, a disk portion 45, a grease lip (radial lip) 46, a seal lip (radial lip) 47 and a side lip 48.

The tubular portion 44 is attached to the outer race 8. More specifically, the tubular portion 44 is engaged by interference fit, namely, is press-fitted into the end portion 8A of the outer race 8. The tubular portion 44 is formed from the elastic ring 41 and the rigid ring 42.

The disk portion 45 extends radially inward from the tubular portion 44 and faces the flange 31B of the rigid ring 31 of the first sealing member 30. The disk portion 45 is located on the outboard side of the tubular portion 44. The disk portion 45 is also formed from the elastic ring 41 and the rigid ring 42.

The grease lip 46 and the seal lip 47 are disposed radially inside the disk portion 45 and are in slidable contact with the sleeve 31A. The grease lip 46 and seal lip 47 is formed from the elastic ring 41.

Between the outer race 8 and the inner race 6, grease is disposed in the space on the outboard side of the disk portion 45 (the internal space of the hub bearing 1). The grease reduces the mutual friction among the balls 10 and 12, the outer race 8, and the inner race 6.

The grease lip 46 is a truncated conical thin plate that extends obliquely from the elastic portion at the radially inner end of the disk portion 45 radially inward and toward the outboard side. The distal end of the grease lip 46 is in contact with the outer peripheral surface of the sleeve 31A. The grease lip 46 prevents outflow of the lubricant from the inner space of the hub bearing 1 toward the inboard side.

Figure 3:
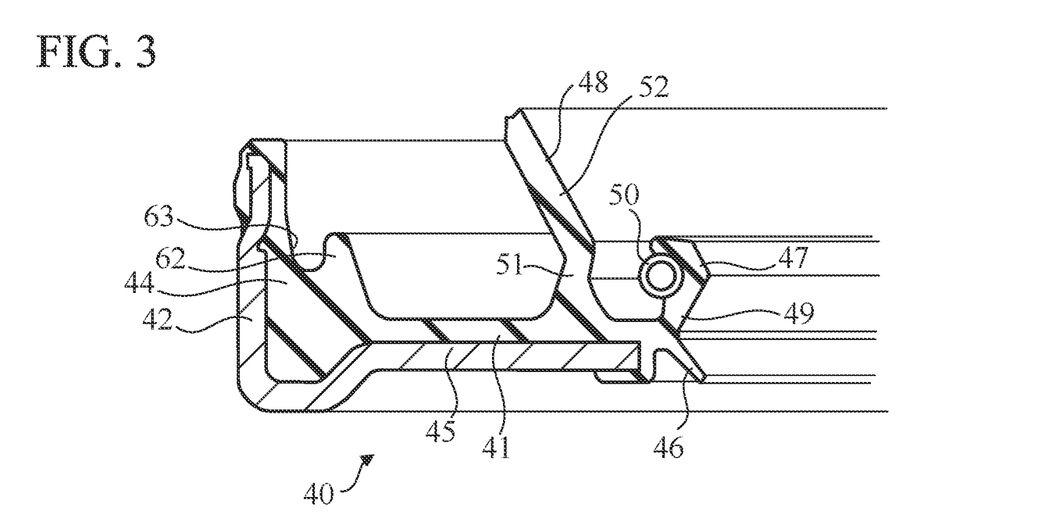
FIG. 3 is a partial cross-sectional view of a second sealing member in the sealing device according to the first embodiment.

The seal lip 47 is a ridge formed on a circular annular portion 49 that extends from the elastic portion at the radially inner end of the disk portion 45 toward the inboard side. The circular annular portion 49 is also formed from the elastic ring 41. As shown in FIG. 3, in the initial state in which the first sealing member 30 and the second sealing member 40 are not combined, the ridge has a triangular cross-section. The seal lip 47 is brought into contact with the outer surface of sleeve 31A and backs up the grease lip 46. In other words, grease that has passed through the grease lip 46 from the outboard side is prevented from flowing out to the inboard side.

A garter spring 50 is wound around the outer circumference of the circular portion 49. The garter spring 50 exerts a radial inward compressive force on the seal lip 47 for enhancing the binding force of the seal lip 47 to the sleeve 31A.

The side lip 48 is a thin plate extending from the elastic portion of the disk portion 45 toward the flange 31B. The side lip 48 is formed from the elastic ring 41. The side lip 48 includes a proximal portion 51 adjacent to the disk portion 45, and a distal portion 52 having a truncated conical shape diagonally extending from the proximal portion 51 radially outward and toward the flange 31B. The distal portion 52 of the side lip 48 is in slidable contact with the flange 31B.

The tubular portion 44 is located radially outside the flange 33 of the first sealing member 30, i.e., further outside of the elastic portion that adheres to the outer edge of the flange 31B of the rigid ring 31. An annular clearance 54 is provided between the tubular portion 44 and the flange 33. From outside the hub bearing 1, through the clearance 54, foreign matter can enter the space 55 between the flange 33 of the first sealing member 30 and the disk portion 45 of the second sealing member 40. Conversely, foreign matter can be discharged from the space 55 to the outside through the clearance 54.

The side lip 48 is in contact with the flange 31B and prevents foreign matter that has entered the space 55 from further advancing toward the seal lip 47. Compared to the space between the disk portion 45 and flange 33, in which the side lip 48 protrudes, the side lip 48 has a very large length. This is because the second sealing member 40 rotates together with the outer race 8, and thus a centrifugal force is applied to the side lip 48. Even though a centrifugal force is applied, the side lip 48 should maintain contact with the flange 31B, so that the side lip 48 is designed to have a large length in order to increase the contact pressure of the side lip 48 to flange 31B. Even if the contact pressure between the side lip 48 and flange 31B is high, it is preferable to reduce the torque given to the second sealing member 40 by the flange 31. Accordingly, the side lip 48 is coated with grease. This grease is typically a different type than the grease that lubricates the balls 10 and 12, the outer race 8, and the inner race 6.

However, since the side lip 48 is subjected to a centrifugal force, the grease around the side lip 48 is blown off. Accordingly, the first sealing member 30 is provided with an annular first protrusion 60 that catches the grease blown off from the side lip 48. The first protrusion 60 protrudes from the elastic portion of the flange 33 toward the disk portion 45 of the second sealing member 40. The first protrusion 60 protrudes from the elastic portion of the flange 33 toward the plate portion 45 of the second sealing member 40. Thus, in this embodiment, the first protrusion 60 is formed from the elastic ring 32. The first protrusion 60 is disposed radially outside the side lip 48 and overlaps the side lip 48 in radial directions. The first protrusion 60 reduces the discharge of grease from the space 55 between the flange 33 and the disk portion 45 subjected by centrifugal force. Since the grease in the space 55 reduces the abrasion of the side lip 48, keeping the grease in the space 55 increases the life span of the side lip 48.

On the other hand, the second sealing member 40 has an annular second protrusion 62 protruding from the elastic portion of the disk portion 45 toward the flange 33 of the first sealing member 30. In this embodiment, the second protrusion 62 is formed from the elastic ring 41. The second protrusion 62 is disposed radially outside the first protrusion 60 and overlaps the first protrusion 60 in radial directions. A circumferential groove 63 depressed relative to the second protrusion 62 is formed on the radially outer side of the second protrusion 62.

The second protrusion 62 formed on the second sealing member 40 is located outside the first protrusion 6, so that it is difficult for foreign matter to enter the space 55 between the flange 33 and the disk portion 45 from the outside. Even if foreign matter does enter the peripheral groove 63, the second protrusion 62 of the second sealing member 40 can repel away the foreign matter since the second sealing member 40 is mounted on the rotating outer race 8.

The inner peripheral surface 62a of the annular second protrusion 62 is inclined and has a diameter that increases toward the flange 33 of the first sealing member 30. Therefore, even if foreign matter enters the space 55, the foreign matter can be easily discharged along the inner peripheral surface 62a of the second protrusion 62. The outer peripheral surface 60a of the first protrusion 60, which faces the inner peripheral surface 62a of the second protrusion 62, is also inclined and has a diameter that increases toward the flange 33 of the first sealing member 30. Therefore, the outer peripheral surface 60a does not block the flow of foreign matter moving along the inner peripheral surface 62a.

Second Embodiment

Figure 4:
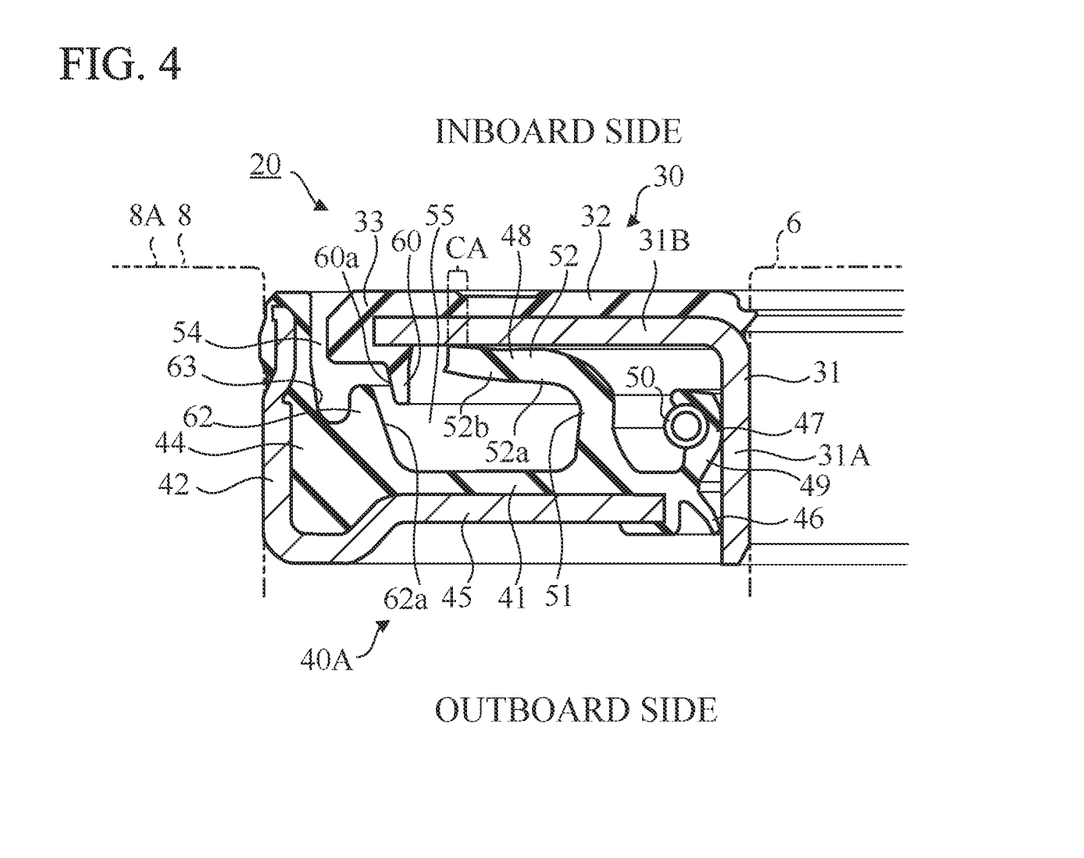
FIG. 4 is a partial cross-sectional view of a sealing device according to a second embodiment of the present invention.
Figure 5:
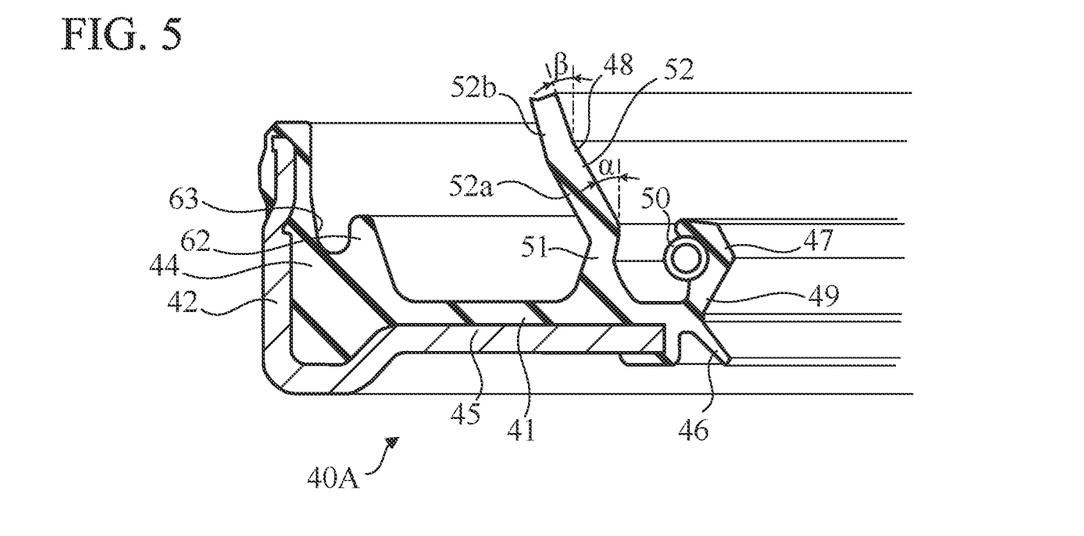
FIG. 5 is a partial cross-sectional view of a second sealing member in the sealing device according to the second embodiment.

FIGS. 4 and 5 relate to a second embodiment of the present invention. In FIG. 4 and subsequent drawings, the same reference symbols are used for identifying components that were already described, and such components will not be described in detail.

In the second sealing member 40A of the sealing device 20 according to the second embodiment, the distal portion 52 of the side lip 48 has a first portion 52a located on the side of the proximal portion 51 and a second portion 52b located on the side opposite to the proximal portion 51.

As shown in FIG. 5, in the initial state in which the first sealing member 30 and the second sealing member 40 are not combined (no force is applied to the side lip 48), the inclination angle β of the second portion 52b with respect to the axial direction of the sealing device 20 is less than the inclination angle α of the first portion 52a with respect to the axial direction of the sealing device 20. In other words, the distal portion 52 of the side lip 48 has two truncated conical portions 52a and 52b, and the second portion 52b, which is the most distal, more approximates a cylinder than the first portion 52a. By virtue of the initial shapes of the first portion 52a and the second portion 52b of the distal portion 52 of the side lip 48, when the first sealing member 30 and the second sealing member 40A are combined and the side lip 48 of the second sealing member 40A is brought into contact with the flange 33 of the first sealing member 30 as shown in FIG. 4, only a narrow area CA of the distal portion 52 of the side lip 48 is brought into contact with the flange 33.

In contrast, in the first embodiment, as shown in FIG. 3, the distal portion 52 of the side lip 48 initially consists of a single truncated conical portion. As shown in FIG. 2, when the first sealing member 30 and the second sealing member 40 are combined and the side lip 48 of the second sealing member 40 is brought into contact with the flange 33 of the first sealing member 30, a very large area CA of the distal portion 52 of the side lip 48 is brought into contact with the flange 33.

Therefore, the second embodiment can reduce the torque imparted from the flange 33 to the second sealing member 40 in comparison with the first embodiment. This effect is more pronounced when the outer race 8 and thus the second sealing member 40 rotates at low speeds. This is because when the second sealing member 40 rotates at high speeds, the centrifugal force exerted on the side lip 48 increases so that the contact area CA between the side lip 48 and the flange 33 becomes smaller even in the first embodiment.

Third Embodiment

Figure 6:
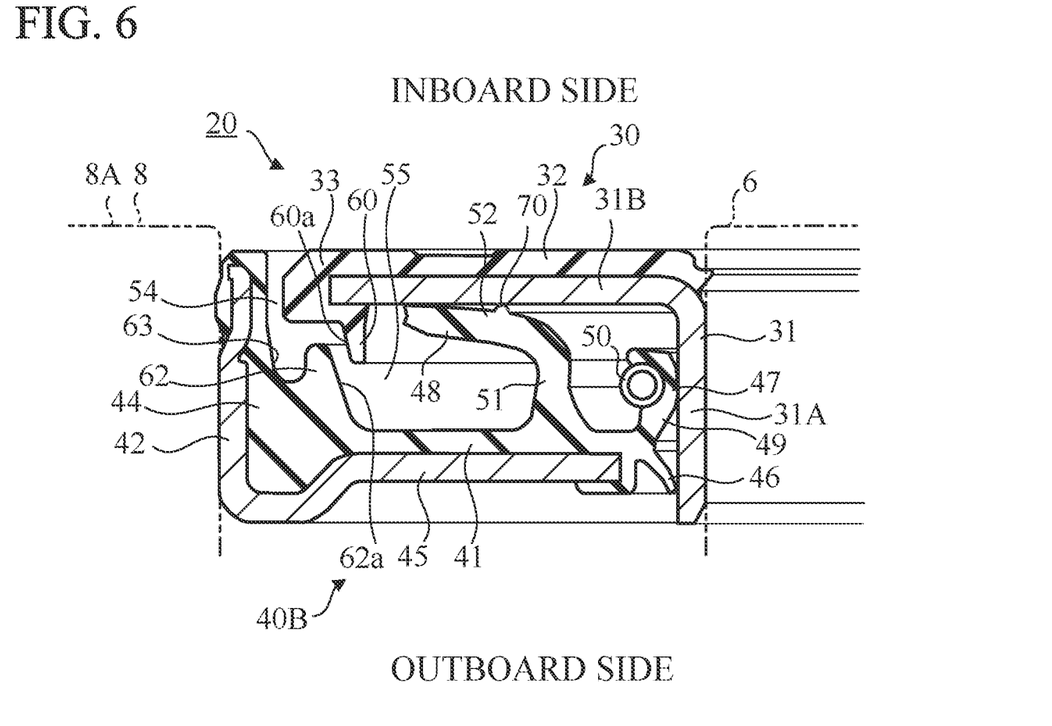
FIG. 6 is a partial cross-sectional view of a sealing device according to a third embodiment of the present invention.
Figure 7:
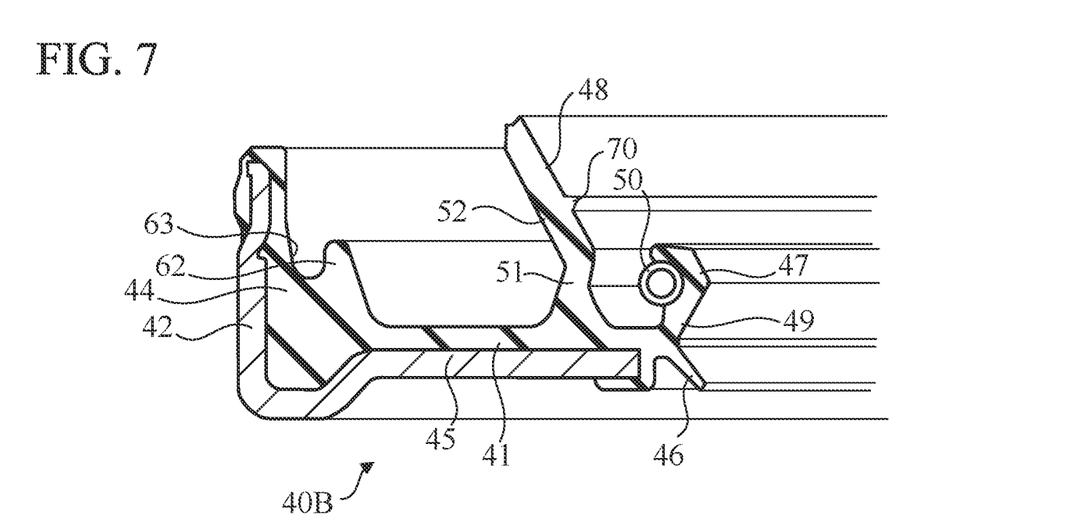
FIG. 7 is a partial cross-sectional view of a second sealing member in the sealing device according to the third embodiment.

FIGS. 6 and 7 relate to a third embodiment according to the invention. In the second sealing member 40B of the sealing device 20 in the third embodiment, the side lip 48 has an annular ridge 70 in addition to the proximal portion 51 and the distal portion 52. The ridge 70 is formed as a continuous circular ring on the surface of the distal portion 52 that faces the flange 33. As shown in FIG. 7, in the initial state in which the first sealing member 30 and the second sealing member 40 are not combined (no force is applied to the side lip 48), the ridge 70 has a triangular cross-section.

As shown in FIG. 6, when the first sealing member 30 and the second sealing member 40B are combined and the side lip 48 of the second sealing member 40B is brought into contact with the flange 33 of the first sealing member 30, the annular ridge formed at the distal portion 5 is brought into contact with the flange 33. FIG. 6 shows that the most distal portion of the distal portion 52 of the side lip 48 is also brought into contact with the flange 33, but the most distal portion of the distal portion 52 may be distant from the flange 33 depending on the position of the ridge 70 and the centrifugal force exerted on the side lip 48.

In contrast, in the first embodiment, as shown in FIG. 2, when the first sealing member 30 and the second sealing member 40 are combined and the side lip 48 of the second sealing member 40 is brought into contact with the flange 33 of the first sealing member 30, a very large area CA of the distal portion 52 of the side lip 48 is brought into contact with the flange 33.

Therefore, in the third embodiment, the area in which the distal portion 52 of the side lip 48 is in contact with the flange 33 is reduced in comparison with the first embodiment, so that the torque imparted from the flange 33 to the second sealing member 40 can be reduced. This effect is more pronounced when the outer race 8 and thus the second sealing member 40 rotates at low speeds. This is because when the second sealing member 40 rotates at high speeds, the centrifugal force exerted on the side lip 48 increases so that the contact area CA between the side lip 48 and the flange 33 becomes smaller even in the first embodiment.

Figure 8:
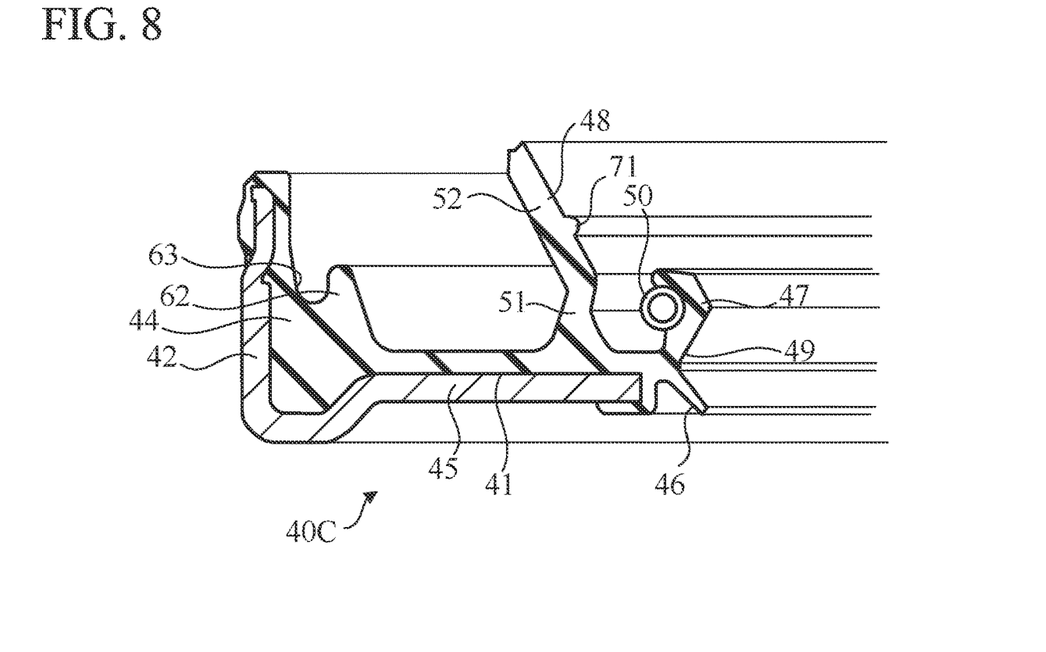
FIG. 8 is a partial cross-sectional view of a second sealing member in the sealing device according to a modification of the third embodiment.

FIG. 8 shows the second sealing member 40C of the sealing device according to a modification of the third embodiment. In the second sealing member 40C, the side lip 48 has a ridge 71 having a semicircular cross section instead of the ridge 70. Thus, the initial cross-sectional shape of the ridge formed on the side lip 48 is not limited.

Other Modifications

The present invention has been shown and described with reference to preferred embodiments thereof. However, it will be understood by those skilled in the art that various changes in form and detail may be made without departing from the scope of the invention as defined by the claims. Such variations, alterations, and modifications are intended to be encompassed in the scope of the present invention.

Figure 9:
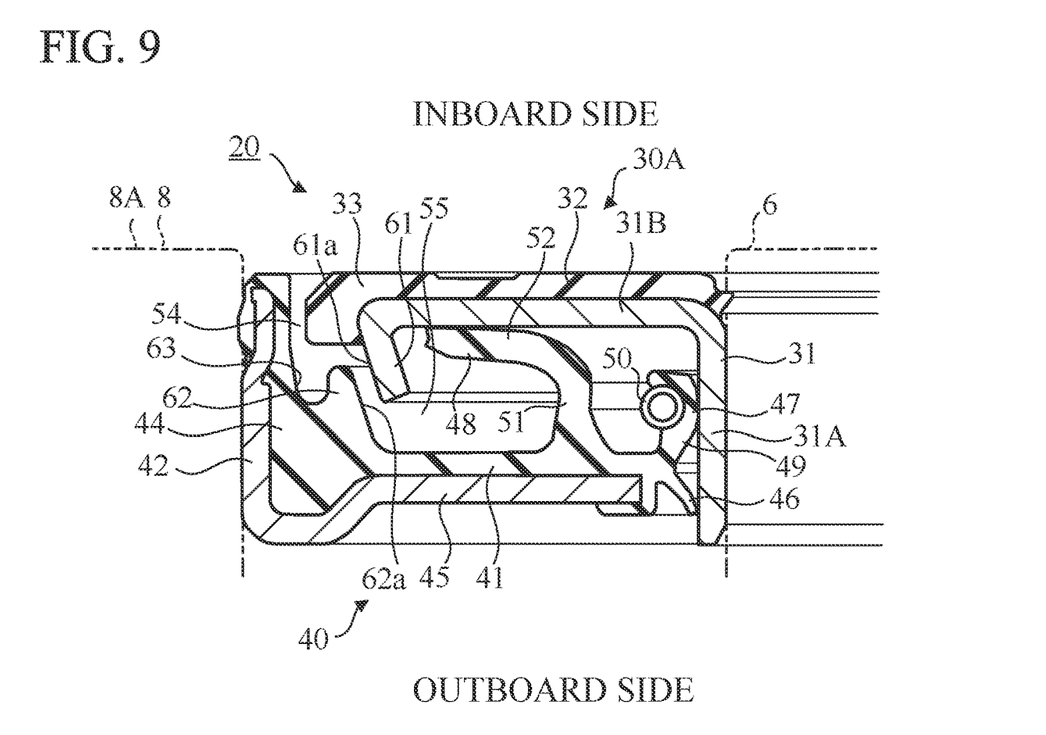
FIG. 9 is a partial cross-sectional view of a sealing device according to a modification of the first embodiment.

For example, in the above embodiments, the first protrusion 60 of the first sealing member 30 is formed in the elastic ring 32. However, as in a modification shown in FIG. 9, a first protrusion 61 may be formed in the rigid ring 31 and may protrude from the outer edge of the flange 31B to the disk portion 45 of the second sealing member 40. The first protrusion 61 is positioned radially outside the side lip 48 and overlaps the side lip 48 in radial directions. The first protrusion 61 reduces the discharge of grease from the space 55 between the flange 33 and the disk portion 45 subjected by centrifugal force. The outer peripheral surface 61a of the first protrusion 61 is inclined and has a diameter that increases toward the flange 33 of the first sealing member 30. The modification shown in FIG. 9 is a modification of the first embodiment, but the first protrusion 61 formed from the rigid material may be provided in other embodiments.

Aspects of the present invention are also set out in the following numbered clauses:

Clause 1. A sealing device adapted to be disposed between a stationary inner member and a rotating outer member for sealing a gap between the inner member and the outer member, the sealing device comprising:
a first sealing member having a sleeve adapted to be mounted on the inner member, and a flange that extends radially outward from the sleeve; and
a second sealing member having a tubular portion disposed radially outside the flange and adapted to be mounted on the outer member, a disk portion that extends radially inward from the tubular portion and that faces the flange, a radial lip disposed radially inside the disk portion and adapted to be in slidable contact with the sleeve, and a side lip extending from the disk portion toward the flange and adapted to be in slidable contact with the flange,
the first sealing member having an annular first protrusion protruding from the flange toward the disk portion of the second sealing member, the first protrusion disposed radially outside the side lip and overlapping the side lip in radial directions,
the second sealing member having an annular second protrusion protruding from the disk portion toward the flange of the first sealing member, the second protrusion disposed radially outside the first protrusion and overlapping the first protrusion in radial directions.

Clause 2. The sealing device according to clause 1, wherein the second protrusion has an inner peripheral surface having a diameter that increases toward the flange of the first sealing member.

According to this clause, even if foreign matter enters the space between the flange of the first sealing member and the disk portion of the second sealing member, the foreign matter can be easily discharged along the inner peripheral surface of the second protrusion.

Clause 3. The sealing device according to clause 1 or 2, wherein the side lip has a proximal portion adjacent to the disk portion, and a distal portion having a truncated conical shape diagonally extending from the proximal portion radially outward and toward the flange,
the distal portion having a first portion located on a side of the proximal portion, and a second portion located on a side opposite to the proximal portion, an inclination angle β of the second portion with respect to the axial direction of the sealing device being less than the inclination angle α of the first portion with respect to the axial direction of the sealing device in an initial state in which no force is applied to the side lip.

According to this clause, by virtue of the initial shapes of the first portion and the second portion of the distal portion of the side lip, when the first sealing member and the second sealing member are combined and the side lip of the second sealing member is brought into contact with the flange of the first sealing member, only a narrow area of the distal portion of the side lip is brought into contact with the flange. Thus, the torque applied from the flange to the second sealing member can be reduced.

Clause 4. The sealing device according to clause 1 or 2, wherein the side lip has a proximal portion adjacent to the disk portion, a distal portion having a truncated conical shape diagonally extending from the proximal portion radially outward and toward the flange, and an annular ridge formed on a surface of the distal portion that faces the flange.

According to this clause, when the first sealing member and the second sealing member are combined and the side lip of the second sealing member is brought into contact with the flange of the first sealing member, the annular ridge formed in the distal portion of the side lip is brought into contact with the flange. Thus, the area in which the distal portion of the side lip is in contact with the flange is reduced, and the torque applied from the flange to the second sealing member can be reduced.

The invention claimed is:

1. A sealing structure, comprising:
    a stationary inner member;
    a rotating outer member; and
    a sealing device disposed between the stationary inner member and the rotating outer member for sealing a gap between the inner member and the outer member, the sealing device including:
    a first sealing member having a sleeve mounted on the inner member, and a flange that extends radially outward from the sleeve; and
    a second sealing member having:
        a tubular portion disposed radially outside the flange and mounted on the outer member,
        a disk portion that extends radially inward from the tubular portion and that faces the flange,
        a radial lip disposed radially inside the disk portion and in slidable contact with the sleeve, and
        a side lip extending radially outward from the disk portion toward the flange and in slidable contact with the flange,
    wherein the first sealing member has an annular first protrusion defined by a terminal end of the flange that extends in a direction toward the disk portion of the second sealing member, the first protrusion disposed radially outside the side lip and overlaps the side lip, and
    wherein the second sealing member has an annular second protrusion protruding from the disk portion toward the flange of the first sealing member, the second protrusion disposed radially outside the first protrusion and overlaps the first protrusion, and wherein the second protrusion has an inner peripheral surface having a diameter that increases toward the flange of the first sealing member.

2. The sealing structure according to claim 1, wherein the side lip has a proximal portion adjacent to the disk portion, and a distal portion having a truncated conical shape diagonally extending from the proximal portion radially outward and toward the flange,
    the distal portion having a first portion located adjacent the proximal portion, and a second portion located distal from the first portion, an inclination angle $\beta$ of the second portion with respect to the axial direction of the sealing device being less than the inclination angle $\alpha$ of the first portion with respect to the axial direction of the sealing device in an initial state in which no force is applied to the side lip.

3. The sealing structure according to claim 1, wherein the side lip has a proximal portion adjacent to the disk portion, a distal portion having a truncated conical shape diagonally extending from the proximal portion radially outward and toward the flange, and an annular ridge formed on a surface of the distal portion that faces the flange.

4. The sealing structure according to claim 3, wherein the annular ridge is located between a tip end of the distal portion and the proximal portion.

5. The sealing structure according to claim 1, wherein the side lip has a proximal portion adjacent to the disk portion, and a distal portion having a truncated conical shape diagonally extending from the proximal portion radially outward and toward the flange,
    the distal portion having a first portion located adjacent the proximal portion, and a second portion located distal from the first portion, an inclination angle $\beta$ of the second portion with respect to the axial direction of the sealing device being less than the inclination angle $\alpha$ of the first portion with respect to the axial direction of the sealing device in an initial state in which no force is applied to the side lip.

6. The sealing structure according to claim 1, wherein the side lip has a proximal portion adjacent to the disk portion, a distal portion having a truncated conical shape diagonally extending from the proximal portion radially outward and toward the flange, and an annular ridge formed on a surface of the distal portion that faces the flange.

7. The sealing structure according to claim 1, wherein the second sealing member has a peripheral groove recessed with respect to the second protrusion, and
    the peripheral groove is located radially outside the second protrusion.

8. The sealing structure according to claim 1, wherein the second protrusion has an inner peripheral surface that is inclined such that the inner peripheral surface has a larger diameter toward the flange.

* * * * *